(12) United States Patent
Krishnamoorthy et al.

(10) Patent No.: US 10,990,253 B1
(45) Date of Patent: Apr. 27, 2021

(54) PREDICTIVE NAVIGATION AND FIELDS PLATFORM TO REDUCE PROCESSOR AND NETWORK RESOURCES USAGE

(71) Applicant: BANK OF AMERICA CORPORATION, Charlotte, NC (US)

(72) Inventors: Madhusudhanan Krishnamoorthy, Chennai (IN); Rahul Uniyal, Dehradun (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/882,866

(22) Filed: May 26, 2020

(51) Int. Cl.
| | | |
|---|---|---|
| *G06F 3/048* | (2013.01) | |
| *G06F 3/0484* | (2013.01) | |
| *G06F 9/451* | (2018.01) | |
| *G06F 40/174* | (2020.01) | |
| *G06F 16/25* | (2019.01) | |
| *G06N 3/04* | (2006.01) | |
| *G06F 21/31* | (2013.01) | |

(52) U.S. Cl.
CPC ............ *G06F 3/0484* (2013.01); *G06F 9/451* (2018.02); *G06F 16/258* (2019.01); *G06F 21/31* (2013.01); *G06F 40/174* (2020.01); *G06N 3/04* (2013.01)

(58) Field of Classification Search
CPC ...... G06F 3/0484; G06F 9/451; G06F 16/258; G06F 40/174
See application file for complete search history.

(56) References Cited

U.S. PATENT DOCUMENTS

| | | | |
|---|---|---|---|
| 7,990,895 | B2 | 8/2011 | Ferguson et al. |
| 8,161,172 | B2 | 4/2012 | Reisman |
| 8,196,063 | B2 | 6/2012 | Apparao et al. |
| 8,239,456 | B2 | 8/2012 | Le Roy et al. |
| 8,259,924 | B2 | 9/2012 | Korolev et al. |
| 8,291,110 | B2 | 10/2012 | Pishevar et al. |
| 8,417,772 | B2 | 4/2013 | Lin et al. |
| 8,433,996 | B2 | 4/2013 | Paulsami et al. |
| 8,516,377 | B2 | 8/2013 | Dixon et al. |
| 8,554,800 | B2 | 10/2013 | Goldentouch |
| 8,560,960 | B2 | 10/2013 | Goossens et al. |
| 8,566,696 | B1 | 10/2013 | Hamon et al. |
| 8,589,559 | B2 | 11/2013 | Smyth et al. |
| 8,612,565 | B2 | 12/2013 | Schneider |
| 8,694,606 | B2 | 4/2014 | Chapweske |
| 8,819,251 | B1 | 8/2014 | Lenz et al. |
| 8,819,541 | B2 | 8/2014 | Nicholas et al. |
| 8,825,628 | B2 | 9/2014 | Feng et al. |
| 8,826,154 | B2 | 9/2014 | Dixon et al. |
| 8,943,172 | B2 | 1/2015 | Davis |
| 8,996,498 | B2 | 3/2015 | Kwan |
| 9,036,807 | B1 | 5/2015 | Tuchman et al. |
| 9,443,197 | B1 | 9/2016 | Burkard et al. |
| 9,524,491 | B2 | 12/2016 | Desai et al. |
| 9,646,100 | B2 | 5/2017 | Shyamsunder et al. |
| 9,654,542 | B2 | 5/2017 | Roskind |

(Continued)

*Primary Examiner* — David E Choi
(74) *Attorney, Agent, or Firm* — Michael A. Springs

(57) ABSTRACT

A navigation prediction tool tracks and analyzes a user's navigation through a software application to predict the interfaces that are most desired by the user. The tool then dynamically changes the presentation of the software application to present these interfaces to the user. The tool may further conserve resources by predicting how the user will fill certain fields in the interface.

20 Claims, 3 Drawing Sheets

(56) References Cited

U.S. PATENT DOCUMENTS

| | | | |
|---|---|---|---|
| 9,659,070 | B2 | 5/2017 | Schneider |
| 9,723,108 | B2 | 8/2017 | Kembel et al. |
| 9,812,013 | B2 | 11/2017 | Pu et al. |
| 10,019,526 | B2 | 7/2018 | Jacobs et al. |
| 10,373,177 | B2 | 8/2019 | Vijayaraghavan et al. |
| 10,380,634 | B2 | 8/2019 | Kumar et al. |
| 10,546,035 | B2 | 1/2020 | Akolkar et al. |
| 2013/0031118 | A1* | 1/2013 | Takamura ............. G06F 16/958 707/758 |
| 2014/0007006 | A1 | 1/2014 | Pallakoff |
| 2014/0280289 | A1* | 9/2014 | Marantz ................ G06F 16/951 707/767 |
| 2014/0331119 | A1 | 11/2014 | Dixon et al. |
| 2015/0178340 | A1 | 6/2015 | Sidman |
| 2016/0179816 | A1* | 6/2016 | Glover .............. G06F 16/24578 707/749 |
| 2016/0231125 | A1 | 8/2016 | Moshfeghi |
| 2016/0314478 | A1* | 10/2016 | Krasnikov ......... G06Q 30/0201 |
| 2016/0370200 | A1 | 12/2016 | LeBeau et al. |
| 2017/0308455 | A1 | 10/2017 | Ryabchun et al. |
| 2017/0323303 | A1 | 11/2017 | Muthu et al. |
| 2019/0259054 | A1 | 8/2019 | Minnis et al. |
| 2020/0034864 | A1 | 1/2020 | Faith et al. |

* cited by examiner

PREDICTIVE NAVIGATION AND FIELDS PLATFORM TO REDUCE PROCESSOR AND NETWORK RESOURCES USAGE

TECHNICAL FIELD

This disclosure relates generally to navigating user interfaces in software applications.

BACKGROUND

Users can use devices to navigate user interfaces in software applications.

SUMMARY OF THE DISCLOSURE

Users use devices like computers, laptops, tablets, and mobile phones to navigate user interfaces in software applications. Conventionally, the presentation of user interfaces in software applications is static. When a software application loads, it presents a starting interface to the user. If the user wants to navigate to other interfaces, then the user performs a series of actions to control that navigation. For example, a user may click links or buttons to navigate to other pages, windows, or menus in the software application. Each click may cause processor and memory resources (e.g., to retrieve and load an interface) and/or network bandwidth (e.g., to communicate the interface over the network to the device) to be consumed. If a user frequently navigates to a particular interface without using or paying attention to the previous interfaces, then these resources are effectively wasted.

This disclosure contemplates a navigation prediction tool that tracks and analyzes a user's navigation through a software application to predict the interfaces that are most desired by the user. The tool then dynamically changes the presentation of the software application to present these interfaces to the user. In this manner, the user need not navigate through other interfaces to reach the desired interface, thereby conserving processor and memory resources and network bandwidth. The tool may further conserve resources by predicting how the user will fill certain fields in the interface. Certain embodiments are described below.

According to an embodiment, an apparatus includes a memory and a hardware processor communicatively coupled to the memory. The hardware processor receives, from a user, a request to load a software application and retrieves, from a database, a record of the user's previous uses of the software application. The record indicates a first chronological ordering of user interface pages visited by the user during a first use of the software application and a second chronological ordering of user interface pages visited by the user during a second use of the software application. The hardware processor then transforms the first chronological ordering into a first vector comprising a numerical representation of the first chronological ordering and transforms the second chronological ordering into a second vector comprising a numerical representation of the second chronological ordering. The hardware processor also generates, by a neural network and based on the first and second vectors, an output vector, transforms the output vector into an output ordering of user interface pages, and after the software application is loaded, directs the software application to a first user interface page in the output ordering.

According to another embodiment, a method includes receiving, by a hardware processor communicatively coupled to a memory and from a user, a request to load a software application and retrieving, by the hardware processor and from a database, a record of the user's previous uses of the software application. The record indicates a first chronological ordering of user interface pages visited by the user during a first use of the software application and a second chronological ordering of user interface pages visited by the user during a second use of the software application. The method also includes transforming, by the hardware processor, the first chronological ordering into a first vector comprising a numerical representation of the first chronological ordering and transforming, by the hardware processor, the second chronological ordering into a second vector comprising a numerical representation of the second chronological ordering. The method further includes generating, by the hardware processor, by a neural network and based on the first and second vectors, an output vector, transforming, by the hardware processor, the output vector into an output ordering of user interface pages, and after the software application is loaded, directing, by the hardware processor, the software application to a first user interface page in the output ordering.

According to another embodiment, a system includes a database and a navigation prediction tool that includes a hardware processor communicatively coupled to a memory. The hardware processor receives, from a user, a request to load a software application and retrieves, from the database, a record of the user's previous uses of the software application. The record indicates a first chronological ordering of user interface pages visited by the user during a first use of the software application and a second chronological ordering of user interface pages visited by the user during a second use of the software application. The hardware processor then transforms the first chronological ordering into a first vector comprising a numerical representation of the first chronological ordering and transforms the second chronological ordering into a second vector comprising a numerical representation of the second chronological ordering. The hardware processor also generates, by a neural network and based on the first and second vectors, an output vector, transforms the output vector into an output ordering of user interface pages, and after the software application is loaded, directs the software application to a first user interface page in the output ordering.

Certain embodiments provide one or more technical advantages. For example, an embodiment predicts a user interface that is desired by a user and presents that interface to the user so that the user does not waste processor and memory resources and network bandwidth navigating to that interface. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
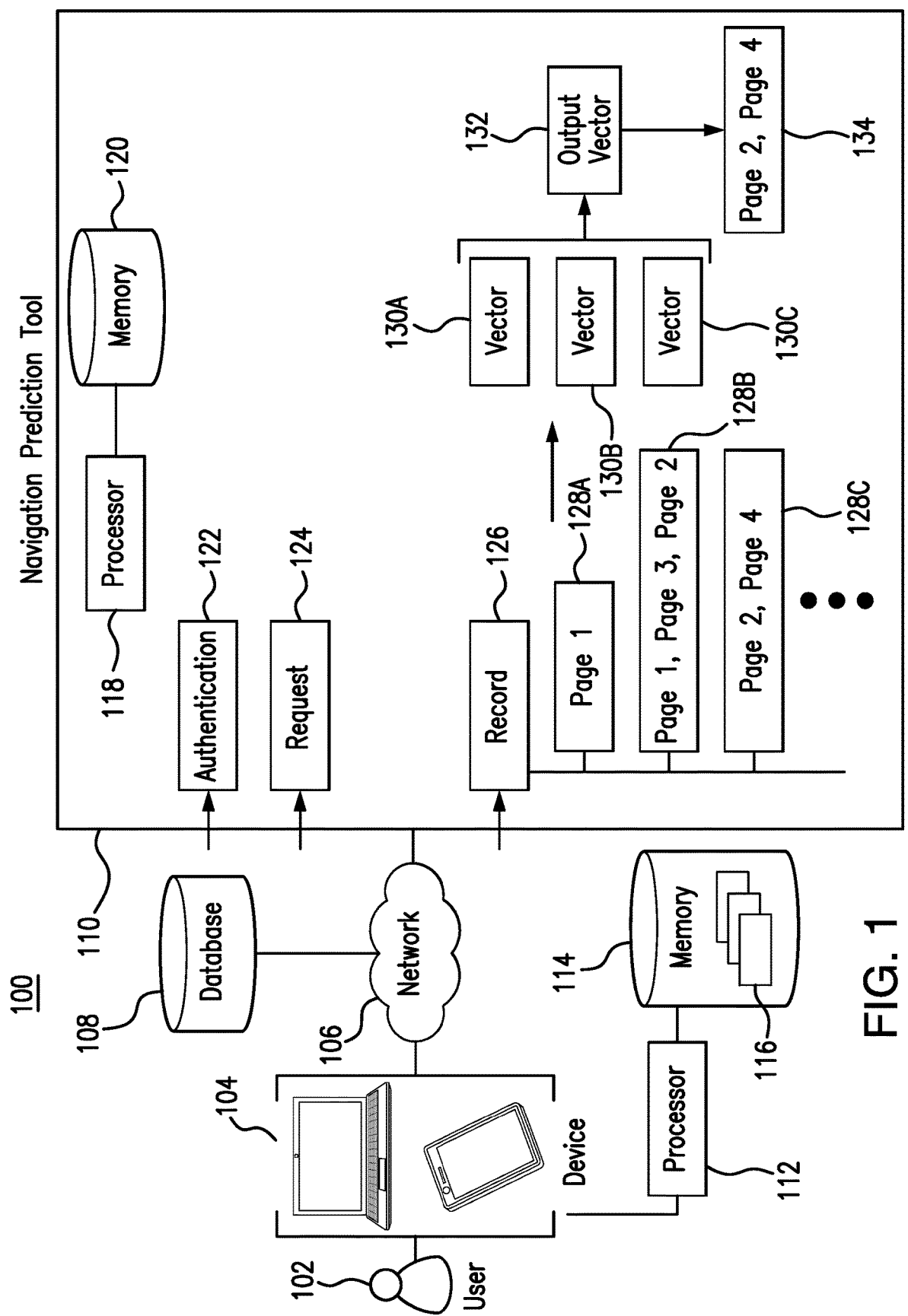
FIG. 1 illustrates an example system.
Figure 2:
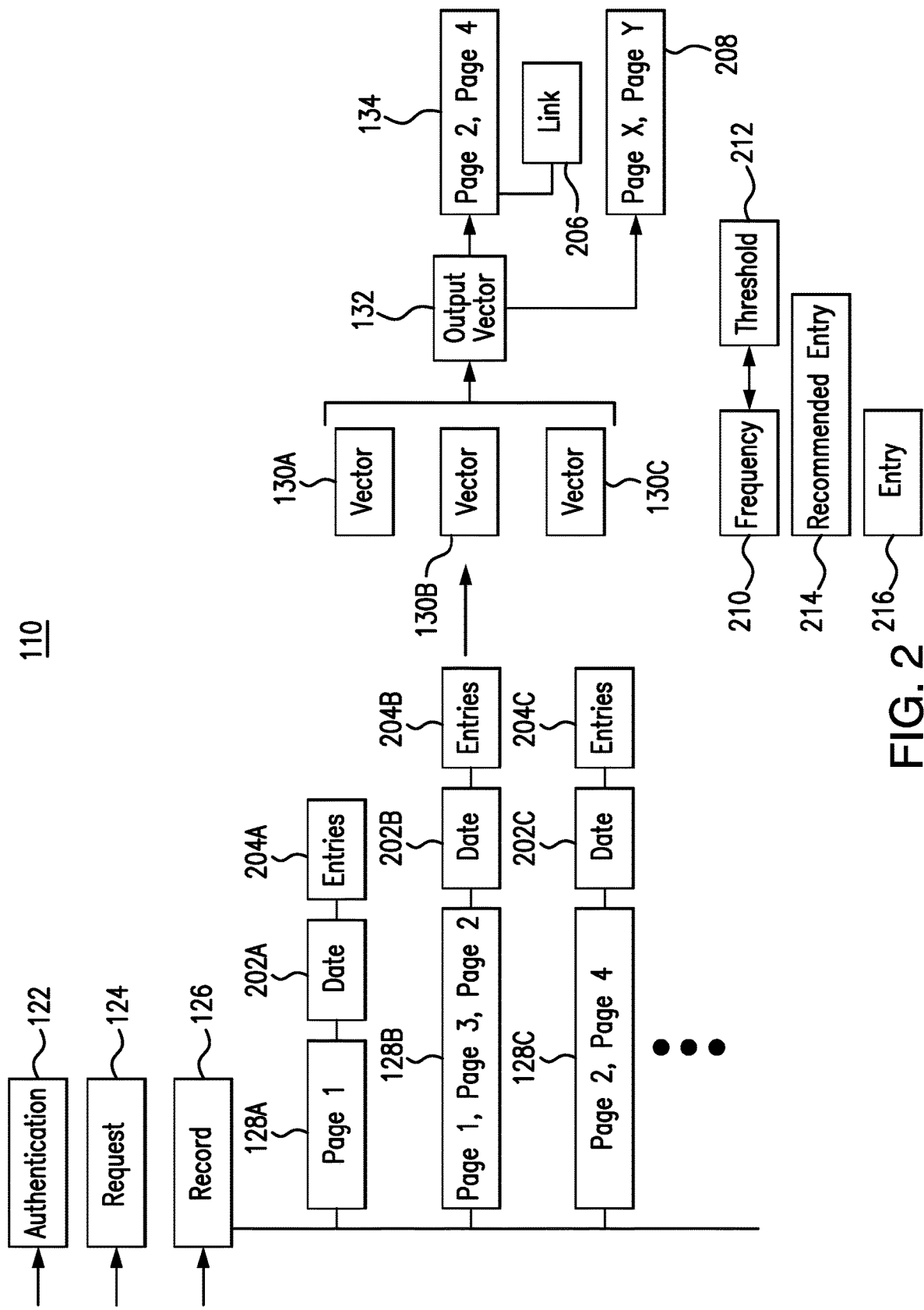
FIG. 2 illustrates an example navigation prediction tool of the system of FIG. 1.
Figure 3:
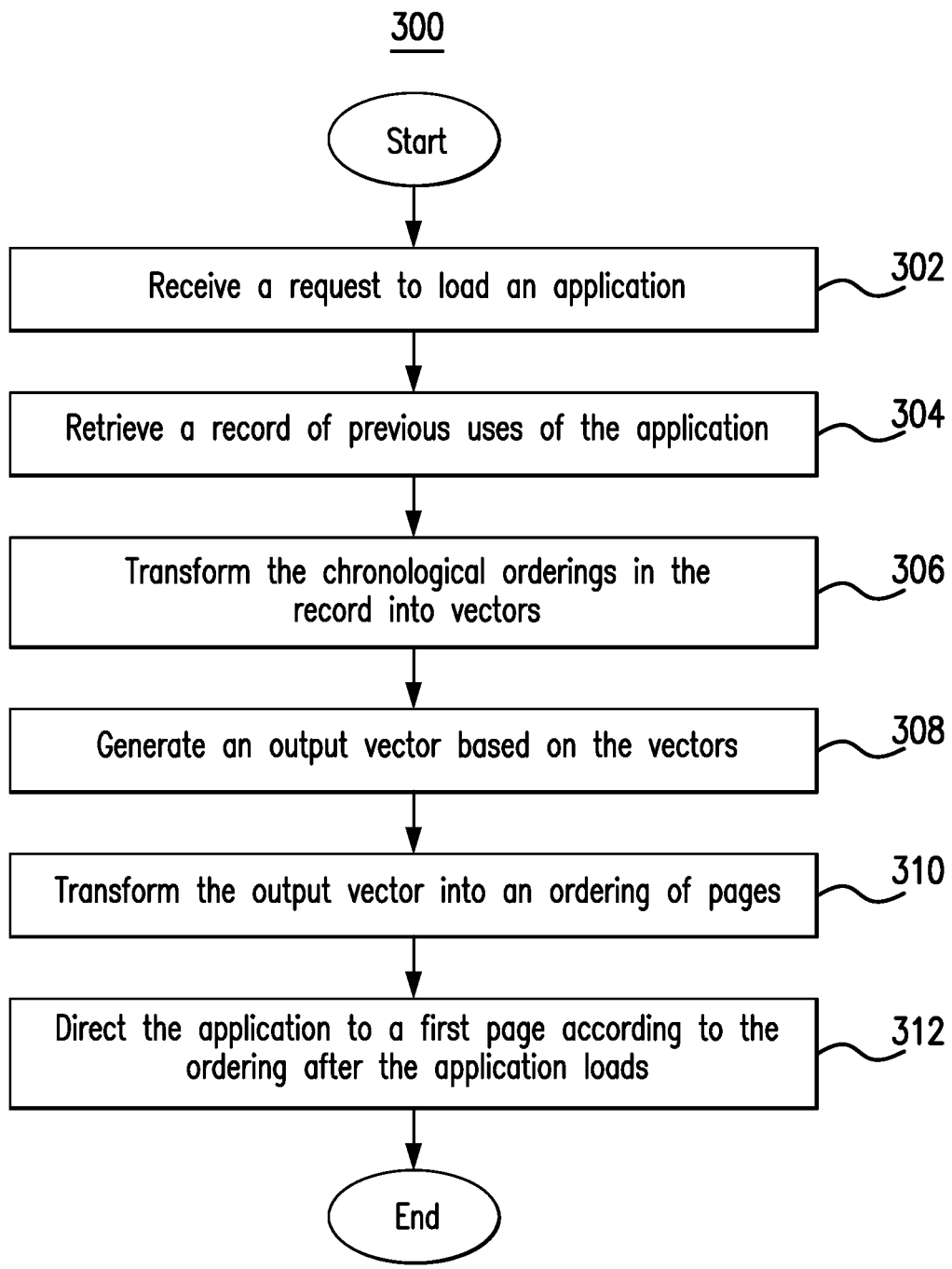
FIG. 3 is a flowchart illustrating a method for predicting navigation using the system of FIG. 1.

Embodiments of the present disclosure and its advantages are best understood by referring to FIGS. 1 through 3 of the drawings, like numerals being used for like and corresponding parts of the various drawings.

Users use devices like computers, laptops, tablets, and mobile phones to navigate user interfaces in software applications. Conventionally, the presentation of user interfaces in software applications is static. When a software application loads, it presents a starting interface to the user. If the user wants to navigate to other interfaces, then the user performs a series of actions to control that navigation. For example, a user may click links or buttons to navigate to other pages, windows, or menus in the software application. Each click may cause processor and memory resources (e.g., to retrieve and load an interface) and/or network bandwidth (e.g., to communicate the interface over the network to the device) to be consumed. If a user frequently navigates to a particular interface without using or paying attention to the previous interfaces, then these resources are effectively wasted.

This disclosure contemplates a navigation prediction tool that tracks and analyzes a user's navigation through a software application to predict the interfaces that are most desired by the user. The tool then dynamically changes the presentation of the software application to present these interfaces to the user. In this manner, the user need not navigate through other interfaces to reach the desired interface, thereby conserving processor and memory resources and network bandwidth. The tool may further conserve resources by predicting how the user will fill certain fields in the interface.

A practical application of the navigation prediction tool is that the tool automatically predicts the user interface that a user desires and presents that interface to the user. In this manner, user does not need to waste processor and memory resources and network bandwidth navigating to the desired interface. The system will be described in more detail using FIGS. 1 through 3.

FIG. 1 illustrates an example system 100. As seen in FIG. 1 system 100 includes one or more devices 104, a network 106, a database 108, and a navigation prediction tool 110. Generally, navigation prediction tool 110 uses one or more neural networks to predict how a user 102 will navigate through one or more interfaces of a software application. Navigation predication tool 110 then directs the software application to the interfaces in the predicted navigation. In particular embodiments, navigation predication tool 110 reduces the processor and memory resources and/or network bandwidth consumed by a user 102 using the software application by skipping portions of the navigation that would otherwise waste resources.

User 102 uses device 104 to execute applications and or interact with other components of system 100. As seen in FIG. 1, device 104 includes a processor 112 and a memory 114. This disclosure contemplates processor 112 and memory 114 being configured to perform any of the functions of device 104 described herein. For example, memory 114 may store one or more software applications 116. The software applications 116 may include software instructions that are executed by processor 112 to perform one or more functions on device 104. User 102 may load a software application 116 on device 104. Software application 116 when executed may present one or more user interfaces to user 102 on device 104. For example, these interfaces may include pages, windows, menus, etc. User 102 may navigate through one or more of these interfaces by performing various actions on device 104 such as, for example, clicking, touching, typing, and/or any other suitable action to issue a command. When user 102 issues a command to proceed to another interface, device 104 may retrieve that interface from a server through network 106. Device 104 may then process the received interface to present that interface to user 102. In conventional systems, user 102 may navigate through several interfaces before arriving at a desired interface. When user 102 does not use or pay attention to the interfaces that are retrieved prior to the desired interface, the resources that are used to retrieve the previous interfaces are wasted. Navigation prediction tool 110 may reduce the amount of wasted resources by predicting the interface that user 102 desires and directing software application 116 to navigate directly to that interface.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Processor 112 is any electronic circuitry, including, but not limited to microprocessors, application specific integrated circuits (ASIC), application specific instruction set processor (ASIP), and/or state machines, that communicatively couples to memory 114 and controls the operation of device 104. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of device 104 by processing information received from network 106 and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data, operational software, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 stores the usage history of user 102. For example, database 108 may store records that track the navigation of user 102 in various software applications 116. When user 102 navigates from interface-to-interface in software application 116, device 104 may generate a record of that navigation and communicate the record to database 108 for storage. These records may then be used for navigation prediction tool 110 to predict the interfaces that user 102 desires when loading application 116. Database 108 may communicate these records to navigation prediction tool 110 when navigation prediction tool 110 requests these records.

Navigation prediction tool 110 uses one or more neural networks to predict the user interfaces that user 102 desires when user 102 loads a software application 116. In particular embodiments, navigation prediction tool 110 reduces the amount of processor and memory resources and/or network bandwidth that is wasted by directing the software application 116 to the predicted interface. As seen in FIG. 1 navigation prediction tool 110 includes a processor 118 and a memory 120. This disclosure contemplates processor 118 and memory 120 being configured to perform any of the functions and/or actions of navigation prediction tool 110 described herein.

Processor 118 is any electronic circuitry, including, but not limited to microprocessors, application specific integrated circuits (ASIC), application specific instruction set processor (ASIP), and/or state machines, that communicatively couples to memory 120 and controls the operation of navigation prediction tool 110.

Processor 118 may be 8-bit, 16-bit, 32-bit, 64-bit or of any other suitable architecture. Processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 118 may include other hardware that operates software to control and process information. Processor 118 executes software stored on memory to perform any of the functions described herein. Processor 118 controls the operation and administration of navigation prediction tool 110 by processing information received from devices 104, network 106, and memory 120. Processor 118 may be a programmable logic device, a microcontroller, a microprocessor, any suitable processing device, or any suitable combination of the preceding. Processor 118 is not limited to a single processing device and may encompass multiple processing devices.

Memory 120 may store, either permanently or temporarily, data, operational software, or other information for processor 118. Memory 120 may include any one or a combination of volatile or non-volatile local or remote devices suitable for storing information. For example, memory 120 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 120, a disk, a CD, or a flash drive. In particular embodiments, the software may include an application executable by processor 118 to perform one or more of the functions described herein.

Navigation prediction tool 110 receives an authentication 122. Authentication 122 may be provided by user 102 via device 104. For example, user 102 may provide a user name, a password, a personal identification number, biometric information, etc. as part of authentication 122. User 102 may provide authentication 122 as part of logging in to the application 116. Navigation prediction tool 110 may use authentication 122 to determine the user 102 that is loading application 116. This information may then be used to retrieve the navigation history of a particular user 102 from database 108.

Navigation prediction tool 110 may receive a request 124 to load software application 116. User 102 and/or device 104 may generate request 124 when user 102 instructs device 104 to load application 116. In some embodiments request, 124 and authentication 122 may be part of the same message communicated to navigation prediction tool 110 when user 102 attempts to load application 116. The information in request 124 may be used by navigation prediction tool 110 to retrieve the navigation history of user 102 in a particular application 116 from database 108.

Navigation prediction tool 110 retrieves record 126 from database 108. Record 126 may include the navigation history of user 102 for a particular application 116. In the example of FIG. 1, record 126 includes various chronological orderings 128 of interfaces that user 102 used during previous executions of application 116. In a first execution of application 116, user 102 used only a first page of application 116. As a result chronological ordering 128A shows only Page 1. During the second execution of application 116, user 102 loaded a first page and then a third page and then a second page, thus, chronological ordering 128B shows Page 1, Page 3, and Page 2. In a third execution of application 116, user 102 used a second page and a fourth page. As a result, chronological ordering 128C shows Page 2 and Page 4. Record 126 may include any suitable number of chronological orderings 128. Each chronological ordering 128 may include any suitable number of interfaces. Although the interfaces shown in the example of FIG. 1 include pages, record 126 may show any suitable type of interface, such as, for example, pages, windows, menus, etc. Each chronological ordering 128 includes a chronological sequence of interfaces that were accessed or used by user 102 during an execution of application 116. Navigation prediction tool 110 may use these chronological orderings 128 to predict the interfaces that are desired by user 102.

Navigation prediction tool 110 converts the chronological orderings 128 into vectors 130. In particular embodiments, navigation prediction tool 110 uses an encoder that receives the information in each chronological ordering 128 and transforms that information into a vector 130. Each vector 130 may include a numerical representation of a chronological ordering 128. Vector 130 may include any number of dimensions. If two vectors 130 are close or similar to each other, then the chronological orderings 128 represented by those vectors 130 are similar to each other. If two vectors 130 are distant or different from each other, then the chronological orderings 128 represented by those vectors 130 are different from each other. In the example of FIG. 1, navigation prediction tool 110 transforms chronological ordering 128A into vector 130A, chronological ordering 128B into vector 130B, and chronological ordering 128C into vector 130C. Navigation prediction tool 110 may then use these vectors 130 to predict a desired interface for user 102. For example, if several vectors 130 are similar to each other, then navigation prediction tool 110 may determine that these vectors 130 show that user 102 has a desired navigation pattern. Vectors 130 may include information about any suitable number of factors considered by the neural network to predict a desired user interface. For example, vectors 130 may also capture the actions performed by user 102 on a particular interface.

Navigation prediction tool 110 may implement and use a neural network, such as, for example, an attention network, to analyze the vectors 130. The neural network analyzes the numerical representations of chronological orderings 128 represented by vectors 130 to generate an output vector 132. Output vector 132 is a numerical representation of a predicted ordering of user interfaces desired by user 102. The neural network may predict the desired ordering of user interfaces based on the historical navigation of user 102 shown by vectors 130. These predictions may be based on any number of factors such as frequency, periodicity, and/or actions performed on each interface.

Navigation prediction tool 110 uses a decoder to transform the output vector 132 into an ordering 134 of user interfaces. The ordering 134 may indicate a predicted ordering of user interfaces that are desired by user 102. In the example of FIG. 1, ordering 134 shows that user 102 desires a second page and then a fourth page. Thus, ordering 134 shows Page 2 followed by Page 4. Navigation prediction tool 110 may then instruct device 104 to navigate to the predicted interfaces shown in ordering 134. In response, device 104 may load Page 2 when application 116 first starts. After user 102 performs an action on Page 2, device 104 may then load Page 4. In this manner, user 102 does not waste resources loading and navigating through undesired pages of application 116. Instead, application 116 is directed to Pages 2 and 4 without forcing user 102 to navigate through other pages (e.g., Pages 1 and 3).

FIG. 2 illustrates an example navigation prediction tool 110 of the system 100 of FIG. 1. Generally, navigation prediction tool 110 uses one or more neural networks to predict the behavior of a user 102 using an application 116. Navigation prediction tool 110 may then direct the software application 116 to certain interfaces and/or to perform certain functions based on the predictions. In this manner, navigation prediction tool 110 reduces the amount of wasted computing resources in particular embodiments.

Navigation prediction tool 110 receives authentication 122 from user 102 and/or device 104. As discussed previously, authentication 122 may include information that authenticates user 102 to navigation prediction tool 110. Authentication 122 may include a username, a password, a personal identification number, biometric information, etc. Navigation prediction tool 110 may use authentication 122 to retrieve information about the user 102 from a database 108.

Navigation prediction tool 110 receives request 124 from user 102 and/or device 104. Request 124 may be a request to load a particular application 116. Device 104 may generate request 124 in response to user 102 issuing a command to load an application 116. Navigation prediction tool 110 may use request 124 to retrieve the user's 102 behavioral history for application 116 from database 108. In particular embodiments, request 124 may include authentication 122.

Navigation prediction tool 110 retrieves record 126 from database 108. Record 126 includes the behavioral history of the user 102 for an application 116. For example, record 126 may include chronological orderings 128 of interfaces that user 102 has used in application 116. Record 126 may include other information in particular embodiments. For example, record 126 may further include dates 202 of when user 102 used application 116. Additionally, record 126 may include actions performed by user 102, such as entries 204 that show how user 102 filled in particular fields of an interface. For example, each page may include certain fields, such as textboxes, that allow user 102 to input entries. Record 126 may track the entries 204 that a user inputted while using application 116. In the example of FIG. 2, record 126 includes a chronological ordering 128A that is associated with a date 202A and entries 204A. This information shows that on a first use of application 116, user 102 used Page 1 of the application 116 on a date 202A. While using Page 1, user 102 filled in fields using entries 204A. During a second use of application 116, user 102 used Page 1, then Page 3, and then Page 2, according to chronological ordering 128B. User 102 used these pages on date 202B and filled in fields on those pages using entries 204B. During the third use of application 116, user 102 used Pages 2 and 4, according to chronological ordering 128C. User 102 used application 116 on a date 202C and filled in fields using entries 204C.

Navigation prediction tool 110 transforms each portion of record 126 into vectors 130 using an encoder. Each vector 130 may include a numerical representation of the various portions of record 126 such as, for example, chronological ordering 128, date 202, and/or entries 204. In the example of FIG. 2, vector 130A includes a numerical representation of chronological ordering 128A, date 202A, and entries 204A. Vector 130B includes a numerical representation of chronological ordering 128B, date 202B, and entries 204B. Vector 130C includes a numerical representation of chronological ordering 128C, date 202C, and entries 204C. Vectors 130 may include any suitable number of dimensions and represent any suitable number of factors associated with user's 102 use of application 116. The more similar the user's behavior during a use of application 116 is to other uses of application 116, the more similar and/or closer the vectors 130 representing those uses are to each other.

Navigation prediction tool 110 may analyze vectors 130 to predict the behavior of user 102 when using application 116. Navigation prediction tool 110 may use a neural network such as, for example, an attention network to analyze vectors 130 to generate an output vector 132. The attention network may analyze the numerical representations in each vector 130 to predict a numerical representation in output vector 132. In this manner, the output vector 132 includes a numerical representation of the predicted behavior of user 102 in application 116. Navigation prediction tool 110 may use output vector 132 to direct software application 116, according to the predicted user behavior.

Navigation prediction tool 110 transforms output vector 132 into an output ordering 134 using a decoder. Output ordering 134 may indicate predicted behavior of user 102 when using application 116. In the example of FIG. 2, navigation prediction tool 110 transforms output vector 132 into an output ordering 134, showing that user 102 is predicted to desire Page 2 and then Page 4 of application 116. This prediction may be based on any suitable number of factors. For example, navigation prediction tool 110 may have analyzed the actions of user 102 during previous uses of application 116. Navigation prediction tool 110 may have determined that user 102 navigates to Page 2 frequently to perform certain actions and then navigates to Page 4 to perform certain actions such as, for example, filling in fields with entries 204. As a result, navigation prediction tool 110 may predict that user 102 will navigate to page 2 first and then page 4. Thus, output ordering 134 shows Page 2 and then Page 4.

Navigation prediction tool 110 may then instruct device 104 to navigate directly to Page 2 first when user 102 loads application 116. After user 102 has completed an action on Page 2, navigation prediction tool 110 may instruct device 104 to navigate to Page 4. In particular embodiments, navigation prediction tool 110 may include a link 206 on Page 2 that directs the application 116 to Page 4 when the link is activated by user 102. In this manner, user 102 is provided a way to navigate directly from Page 2 to Page 4. As a result, navigation prediction tool 110 dynamically changes the behavior of software application 116 to conform to the predicted behavior of user 102. In particular embodiments, by dynamically altering the behavior of software application 116, navigation prediction tool 110 reduces the amount of wasted computing resources such as, for example, processor and memory resources and/or network bandwidth.

In certain embodiments, navigation prediction tool 110 analyzes any certain number of factors to generate output vector 132. For example, navigation prediction tool 110 may analyze the dates 202 on which user 102 used application 116 and/or performed certain actions in application 116. Vectors 130 may include a numerical representation of these dates 202. Output vector 132 may be different depending on the date that user 102 is requesting to load application 116. For example, if navigation prediction tool 110 predicts that user 102 navigates to a particular page of application 116 on a particular day of the week or a particular day of the month, navigation prediction tool 110 may determine an output vector 132 that is different on that particular day of the week or that particular day of the month. Navigation prediction tool 110 may then transform output vector 132 into a different output ordering 208. In the example of FIG. 2, output ordering 208 may show a different ordering of pages than output ordering 134. In this manner, navigation prediction tool 110 may dynamically alter the behavior of software application 116 based on any number of factors such as, for example, the dates 202 of use.

In particular embodiments, navigation prediction tool 110 may further predict the entries 204 that user 102 will use to fill certain fields of certain interfaces. For example, navigation prediction tool 110 may determine a frequency 210, at which a user 102 fills in a particular field of an interface with a particular entry 204. Navigation prediction tool 110 then compares that frequency 210 against a threshold 212. Depending on whether frequency 210 meets or exceeds threshold 212, navigation prediction tool 110 may perform various predictive actions for that particular field. For example, if frequency 210 does not meet threshold 212, navigation prediction tool 110 may determine a recommended entry 214 for that particular field. As a result, when user 102 begins filling in that field, navigation prediction tool 110 may recommend recommended entry 214 to user 102 for selection. In this manner, user 102 may not waste additional resources completing the field. If frequency 210 meets threshold 212, navigation prediction tool 110 may predict an entry 216 for a particular field. The predicted entry may be based on the previous entries 204 that user 102 used to fill that field. Navigation prediction tool 110 may include a numerical representation of those entries in a vector 130 and make the prediction to output vector 132. Navigation prediction tool 110 may then transform output vector 132 to produce entry 216, in certain embodiments. In certain embodiments, navigation prediction tool 110 may predict entries 216 separate from vectors 130 and output vector 132. For example, navigation prediction tool 110 may use a separate neural network such as, for example, a memory network to predict entry 216 based on entries 204. After navigation prediction tool 110 has predicted entry 216, navigation prediction tool 110 may automatically fill a particular field with entry 216 when user 102 loads the interface that includes that field. In this manner, navigation prediction tool 110 reduces the amount of computing resources wasted in filling fields of the interface in particular embodiments.

FIG. 3 is a flow chart illustrating a method 300 for predicting navigation, using the system 100 of FIG. 1. Generally, navigation prediction tool 110 performs the steps of method 300. By performing method 300, navigation prediction tool 110 reduces the amount of wasted computing resources when using a software application 116 in particular embodiments.

Navigation prediction tool 110 begins by receiving a request 124 to load an application 116 in step 302. The request 124 may include an authentication 122 from a user 102 using device 104. In step 304, navigation prediction tool 110 retrieves a record 126 of previous uses of the application 116. The record 126 may include chronological orderings 128 that show the chronological orderings of interfaces accessed by the user 102 during previous uses of application 116. In step 306, navigation prediction tool 110 transforms the chronological orderings 128 in record 126 into vectors 130. Vectors 130 include numerical representations of the chronological orderings 128. Navigation prediction tool 110 analyzes the vectors 130 using a neural network, such as an attention network, to generate an output vector 132 in step 308. Output vector 132 includes a numerical representation of the predicted behavior of user 102 using application 116. Navigation prediction tool 110 transforms the output vector 132 into an output ordering 134 of interfaces in step 310. The interfaces may include pages, windows, menus, etc. In step 312, navigation prediction tool 110 directs the application 116 to a first page, according to the output ordering 134, after the application 116 loads. In this manner, the application 116 navigates directly to the interface that is predicted to be desired by user 102. As a result, user 102 does not waste computing resources navigating to the desired interface in particular embodiments.

Modifications, additions, or omissions may be made to method 300 depicted in FIG. 3. Method 300 may include more, fewer, or other steps. For example, steps may be performed in parallel or in any suitable order. While discussed as navigation prediction tool 110 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
receive, from a user, a request to load a software application;
retrieve, from a database, a record of the user's previous uses of the software application, the record indicating a first chronological ordering of user interface pages visited by the user during a first use of the software application and a second chronological ordering of user interface pages visited by the user during a second use of the software application;
transform the first chronological ordering into a first vector comprising a numerical representation of the first chronological ordering;
transform the second chronological ordering into a second vector comprising a numerical representation of the second chronological ordering;
generate, by a neural network and based on the first and second vectors, an output vector;
transform the output vector into an output ordering of user interface pages;
after the software application is loaded, direct the software application to navigate to a first user interface page in the output ordering; and
after the user completed an action on the first user interface page, direct the software application to navigate to a second user interface page in the output ordering.

2. The apparatus of claim 1, wherein:
the record further indicates a first date of the first user and a second date of the second use;
the first vector further comprises a numerical representation of the first date;
the second vector further comprises a numerical representation of the second date; and
the output vector is generated based on the numerical representation of the first date and the numerical representation of the second date.

3. The apparatus of claim 1, wherein:
the record further indicates a first entry into a field of the first user interface page during the first use and a second entry into the field during the second use;
the hardware processor is further configured to:
determine, based on the record, a frequency at which the user uses the field;
determine that the frequency is above a threshold;
in response to determining that the frequency is above the threshold, predict, using a neural network and based on the first and second entries, an output entry; and
after directing the software application to the first user interface page, fill the field using the output entry.

4. The apparatus of claim 1, the hardware processor is further configured to:
receive, from the user, a second request to load a second software application different from the first software application;
generate, based on the output vector, a second output ordering of user interface pages for the second software application; and
after the second software application is loaded, direct the second software application to a first user interface page in the second output ordering.

5. The apparatus of claim 1, the hardware processor is further configured to:
detect that the user is filling a field of the first user interface page; and
in response to detecting that the user is filling the field, recommend to the user an entry to fill the field.

6. The apparatus of claim 1, the hardware processor is further configured to receive a user authentication from the user, wherein generating the output vector is further based on the user authentication.

7. The apparatus of claim 1, the hardware processor is further configured to provide on the first user interface page a link to a second user interface page in the output ordering.

8. A method comprising:
receiving, by a hardware processor communicatively coupled to a memory and from a user, a request to load a software application;
retrieving, by the hardware processor and from a database, a record of the user's previous uses of the software application, the record indicating a first chronological ordering of user interface pages visited by the user during a first use of the software application and a second chronological ordering of user interface pages visited by the user during a second use of the software application;
transforming, by the hardware processor, the first chronological ordering into a first vector comprising a numerical representation of the first chronological ordering;
transforming, by the hardware processor, the second chronological ordering into a second vector comprising a numerical representation of the second chronological ordering;
generating, by the hardware processor, by a neural network and based on the first and second vectors, an output vector;
transforming, by the hardware processor, the output vector into an output ordering of user interface pages;
after the software application is loaded, directing, by the hardware processor, the software application to navigate to a first user interface page in the output ordering; and
after the user completed an action on the first user interface page, directing the software application to navigate to a second user interface page in the output ordering.

9. The method of claim 8, wherein:
the record further indicates a first date of the first user and a second date of the second use;
the first vector further comprises a numerical representation of the first date;
the second vector further comprises a numerical representation of the second date; and
the output vector is generated based on the numerical representation of the first date and the numerical representation of the second date.

10. The method of claim 8, further comprising:
determining, by the hardware processor and based on the record, a frequency at which the user uses the field, the record further indicates a first entry into a field of the first user interface page during the first use and a second entry into the field during the second use;

determining, by the hardware processor, that the frequency is above a threshold;

in response to determining that the frequency is above the threshold, predicting, by the hardware processor, using a neural network and based on the first and second entries, an output entry; and after directing the software application to the first user interface page, filling, by the hardware processor, the field using the output entry.

11. The method of claim 8, further comprising:

receiving, by the hardware processor and from the user, a second request to load a second software application different from the first software application;

generating, by the hardware processor and based on the output vector, a second output ordering of user interface pages for the second software application; and after the second software application is loaded, directing, by the hardware processor, the second software application to a first user interface page in the second output ordering.

12. The method of claim 8, further comprising:

detecting, by the hardware processor, that the user is filling a field of the first user interface page; and in response to detecting that the user is filling the field, recommending, by the hardware processor, to the user an entry to fill the field.

13. The method of claim 8, further comprising receiving, by the hardware processor, a user authentication from the user, wherein generating the output vector is further based on the user authentication.

14. The method of claim 8, further comprising providing, by the hardware processor, on the first user interface page a link to a second user interface page in the output ordering.

15. A system comprising:

a database; and a navigation prediction tool comprising a hardware processor communicatively coupled to a memory, the hardware processor configured to:

receive, from a user, a request to load a software application;

retrieve, from the database, a record of the user's previous uses of the software application, the record indicating a first chronological ordering of user interface pages visited by the user during a first use of the software application and a second chronological ordering of user interface pages visited by the user during a second use of the software application;

transform the first chronological ordering into a first vector comprising a numerical representation of the first chronological ordering;

transform the second chronological ordering into a second vector comprising a numerical representation of the second chronological ordering;

generate, by a neural network and based on the first and second vectors, an output vector;

transform the output vector into an output ordering of user interface pages;

after the software application is loaded, direct the software application to navigate to a first user interface page in the output ordering; and after the user completed an action on the first user interface page, direct the software application to navigate to a second user interface pace in the output ordering.

16. The system of claim 15, wherein:

the record further indicates a first date of the first user and a second date of the second use;

the first vector further comprises a numerical representation of the first date;

the second vector further comprises a numerical representation of the second date; and the output vector is generated based on the numerical representation of the first date and the numerical representation of the second date.

17. The system of claim 15, wherein:

the record further indicates a first entry into a field of the first user interface page during the first use and a second entry into the field during the second use;

the hardware processor is further configured to:

determine, based on the record, a frequency at which the user uses the field;

determine that the frequency is above a threshold;

in response to determining that the frequency is above the threshold, predict, using a neural network and based on the first and second entries, an output entry; and after directing the software application to the first user interface page, fill the field using the output entry.

18. The system of claim 15, the hardware processor is further configured to:

receive, from the user, a second request to load a second software application different from the first software application;

generate, based on the output vector, a second output ordering of user interface pages for the second software application; and after the second software application is loaded, direct the second software application to a first user interface page in the second output ordering.

19. The system of claim 15, the hardware processor is further configured to:

detect that the user is filling a field of the first user interface page; and in response to detecting that the user is filling the field, recommend to the user an entry to fill the field.

20. The system of claim 15, the hardware processor is further configured to receive a user authentication from the user, wherein generating the output vector is further based on the user authentication.

* * * * *